United States Patent [19]

Stinson et al.

[11] 4,292,067
[45] Sep. 29, 1981

[54] PRODUCTION OF UREA-AMMONIUM POLYPHOSPHATES FROM UREA PHOSPHATE

[75] Inventors: John M. Stinson, Sheffield; James R. Burnell, Killen, both of Ala.

[73] Assignee: Tennessee Valley Authority, Muscle Shoals, Ala.

[21] Appl. No.: 120,949

[22] Filed: Feb. 12, 1980

Related U.S. Application Data

[63] Continuation of Ser. No. 71,436, Aug. 31, 1979, now Defensive Publication No. T998,001.

[51] Int. Cl.³ .............................................. C05C 9/00
[52] U.S. Cl. ...................................... 71/29; 71/64.1; 423/306
[58] Field of Search ................. 71/29, 36, 41, 43, 640; 423/306

[56] References Cited

U.S. PATENT DOCUMENTS 3,713,802  1/1973  Gittenait ................................. 71/29
4,217,128  8/1980  Stinson, et al. .........................71/29

Primary Examiner—S. Leon Bashore
Assistant Examiner—F. H. Lander
Attorney, Agent, or Firm—Robert A. Petrusek

[57] ABSTRACT

Crystalline urea phosphate mixed with sufficient quantities of previously produced urea-ammonium polyphosphate liquid to provide fluidity is pyrolyzed batchwise in one stage to give molten urea ammonium polyphosphate containing up to 50 percent of the phosphate as polyphosphate. Water or aqua ammonia can be substituted for the polyphosphate liquid if certain prescribed steps in proper sequence are followed. Heat from ammoniation of the urea phosphate provides all of the heat for pyroloysis. The molten urea-ammonium polyphosphate is then processed into high-analysis liquid fertilizer.

18 Claims, 3 Drawing Figures

BATCH PRODUCTION OF UREA-AMMONIUM POLYPHOSPHATES
FROM UREA-PHOSPHATE

BATCH PRODUCTION OF UREA-AMMONIUM POLYPHOSPHATES
FROM UREA-PHOSPHATE

TIME AND TEMPERATURE RELATIONSHIP IN TESTS OF BATCH-
CONTINUOUS PYROLYSIS OF UREA PHOSPHATE--
ALL HEAT PROVIDED FROM AMMONIATION

TIME AND TEMPERATURE RELATIONSHIP IN TESTS OF BATCH-
CONTINUOUS PYROLYSIS OF UREA PHOSPHATE --
ALL HEAT PROVIDED FROM AMMONIATION

PRODUCTION OF UREA-AMMONIUM POLYPHOSPHATES FROM UREA PHOSPHATE

The invention herein described may be manufactured and used by or for the Government for governmental purposes without the payment to us of any royalty therefor.

This is a continuation of application Ser. No. 71,436, filed Aug. 31, 1979, for PRODUCTION OF UREA-AMMONIUM POLYPHOSPHATES FROM UREA PHOSPHATE now Defensive Publication No. T998,001, published Sept. 2, 1980.

Our invention relates to an improvement in methods of producing fertilizers containing polyphosphate; more particularly it relates to a batch process for the manufacture of highly concentrated liquid fertilizers produced from phosphoric acid of the wet-process type, urea, and ammonia; and more particularly to the production of such highly concentrated liquid fertilizers containing polyphosphates by batch pyrolysis of the well-known compound, urea phosphate [$CO(NH_2)_2 \cdot H_3PO_4$] wherein the previously required separate step of concentrating said wet-process phosphoric acid up to the range of superphosphoric acid to form polyphosphate followed by ammoniation of said superphosphoric acid and then addition of urea to form urea-ammonium polyphosphate is entirely eliminated; said process for the production of urea-ammonium polyphosphate characterized by the fact that the product therefrom is substantially free from unavailable $P_2O_5$ and that said process can be operated under a variety of conditions so as to produce liquid fertilizers that contain up to half of the total phosphate as polyphosphates. The necessary conditions for formation of the desired polyphosphate content can be obtained by a batch pyrolysis procedure in a single vessel. After the polyphosphates are formed, the molten urea-ammonium polyphosphate is processed into a liquid by dissolution in water and further ammoniation to the desired final pH.

Liquid fertilizers having compositions similar to those of standard dry mixed fertilizers are well known in the industry and are increasing in popularity. Such solutions have the advantage over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers. However, liquid fertilizers in the past have had some outstanding disadvantages. Water-soluble materials of relatively high cost had to be used to obtain precipitate-free solutions and the solutions produced were oftentimes so corrosive as to result in high maintenance and storage costs. The solutions also, in the past, have been limited to a maximum plant food content of about 33 percent by weight because experience has taught that concentration in excess of this amount resulted in crystallization and precipitation of salts. Even then, raw materials of high purity had to be used to prevent precipitation of salts at lower plant food contents. For example, satisfactorily clear liquid fertilizers could not be produced with the popular wet-process phosphoric acid even at very low plant food contents.

One of the breakthroughs in overcoming disadvantages in liquid mixed fertilizers is taught and described in U.S. Pat. No. 2,950,961, Striplin et al. Striplin has discovered that he is able to prepare a liquid mixed fertilizer containing substantial values of both N and $P_2O_5$ in a process wherein he rapidly and intimately introduces ammonia and superphosphoric acid into a reaction vessel under controlled conditions. As is taught by Striplin, the superphosphoric acid utilized in his process is ammoniated in such a way that the resulting ammonium polyphosphate salts which comprise his liquid fertilizers are proportioned in his product in substantially the same dependent and proportional relationship as are the various species of polyphosphoric acids originally present in his superphosphoric acid constituent. It is believed that the retention of these species of polyphosphoric acids as the ammonium salts thereof is beneficial in restraining the precipitation of salts in his product solution.

In another breakthrough in overcoming the disadvantages of liquid mixed fertilizers produced by the prior-art methods, there is found in application Ser. No. 835,377, John G. Getsinger, filed Aug. 21, 1959, and assigned to the assignee of the present invention (now abandoned), the discovery that if phosphoric acid of the wet-process type is subjected to evaporating means, either at atmospheric or at reduced pressure, so as to condense the wet acid and raise its $P_2O_5$ content up to as high as 76 percent $P_2O_5$, the formation of gelatinous precipitates which otherwise render wet-process phosphoric acid unusable for the preparation of high-analysis liquid mixed fertilizers are substantially sequestered. In addition, there is taught in said application that if wet-process phosphoric acid is so concentrated, it may then be subsequently ammoniated to form liquid mixed fertilizers in which the congeneric impurities originally present in said wet-process phosphoric acid are sequestered and caused to remain in solution, thereby eliminating the formation of said gelatinous precipitates. Substantially the same teachings wherein commercial grade wet-process phosphoric acid is concentrated and then subsequently ammoniated to form liquid mixed fertilizers is also found in U.S. Pat. No. 3,044,851, D. C. Young. As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Striplin disclosure. As may also be seen from a consideration of the economics involved, it is, in many cases, more highly desirable to produce such liquid mixed fertilizers by the ammoniation of concentrated wet-process superphosphoric acid rather than from the ammoniation of the cleaner, but more expensive, superphosphoric acid of the electric-furnace type.

In still another breakthrough in overcoming some of the disadvantages of liquid fertilizers produced by the prior-art methods, there is found in U.S. Pat. Nos. 3,171,733, 3,228,752, and 3,264,085, Hignett et al, all assigned to the assignee of the present invention, the discovery of new compositions of matter and methods for their production which contain up to about 80 percent of their weight in the form of available plant food and which are produced by a process of directly reacting anhydrous ammonia with superphosphoric acid at elevated temperatures and pressures. These compositions of matter may either be directly applied to the soil as a solid fertilizer or be shipped from the point of manufacture to the intended point of usage and then subsequently simply be dissolved in water, thereby effecting the production of high-analysis liquid mixed fertilizer suitable for application to the soil. In these teachings of Hignett et al, the feed material for the reactor is anhydrous ammonia and superphosphoric acid, either of the electric-furnace type or the wet-process type. In his teachings, polyphosphate is present in the superphosphoric acid prior to ammoniation. This requirement necessitates, when said superphosphoric acid is derived from the leaching of phosphate rock by sulfuric acid, i.e., wet-process acid, of concentrating the ordinary or merchant-grade wet-process acid up to the superphosphoric acid range by means of a separate and fairly costly concentration step in that special equipment and materials of construction must be used to insure against the corrosive characteristics of acid so concentrated, and in the thermal requirements from the fuel to be used therein.

And in still another breakthrough in overcoming some of the disadvantages of liquid and solid mixed fertilizers produced by the prior-art methods, there is found in U.S. Pat. No. 3,382,059, John G. Getsinger, assigned to the assignee of the present invention, the discovery of a process for the production of highly concentrated liquid ammonium polyphosphate fertilizers produced by the ammoniation of phosphoric acid of the wet-process type which overcomes certain of these disadvantages of the prior art and which will greatly influence an economic swing to the use of wet-process acid as the starting constituent rather than the more highly priced electric-furnace type acid. Getsinger has developed a reliable, simple, and efficient method for the production of liquid ammonium polyphosphate fertilizers by utilizing ordinary merchant-grade wet-process phosphoric acid in the $P_2O_5$ content range from about 50 to 58 percent by weight wherein the separate step of subjecting said acid to an evaporating step to increase its $P_2O_5$ content is substantially eliminated, thereby greatly improving on the economics involved.

Further, Getsinger has found that, in carrying out his process for the manufacture of liquid fertilizers by the ammoniation of merchant-grade wet-process phosphoric acid, he can utilize the free heat of ammoniation to evaporate water and form polyphosphate rather than require the use of expensive heat form fossil fuel. In the Getsinger process, a portion of the free water and essentially all of the chemical water is evaporated from the orthophosphoric acid in the second stage; the first stage is used essentially to recover the ammonia evolved from the second stage in order to prevent an ammonia loss from the process, and in so doing, the heat of ammoniation that is generated is used to evaporate free water from the resulting partially ammoniated feed acid. In addition, in his process, the evaporation of water is from a relatively noncorrosive acid salt solution instead of from a highly corrosive acid, thus allowing the use of less expensive materials of construction when carrying out his process.

Subsequent to the original work by Getsinger, it has been discovered by his associates that although the two-stage ammoniation process of Getsinger is a new and useful tool in producing ammonium polyphosphates by a method which substantially eliminates the necessity of first separately concentrating wet-process phosphoric acid from merchant-grade strength up to the superphosphoric acid range it has certain limitations, the greatest of which perhaps is the degree of availability of the total $P_2O_5$ content of the ammonium polyphosphate produced thereby. It should be understood that $P_2O_5$ availability referred to is determined by standard procedures used in the fertilizer industry and defined in the Official Methods of Analysis of the Association of Official Agricultural Chemists, 10th Edition, 1965, published by the Association of Official Agricultural Chemists, Washington, D.C.

It has been found that highly desirable products can be produced by the two-stage ammoniation process of Getsinger only when the feed acids contain relatively low metallic impurity contents or low polyphosphate contents. The metallic impurity content may be expressed as the $R_2O_3:P_2O_5$ mole ratio wherein $R_2O_3$ symbolizes the weight percent of the total of the two principal metallic impurities, iron and aluminum, reported as their oxides. For example, depending on the maximum operating temperature of the two-stage ammoniation process of Getsinger, it was found that the percentage of $P_2O_5$ availability falls off rapidly from substantially 100 percent when the $R_2O_3:P_2O_5$ mole ratio is greater than about 0.04. As a result, undesirable reactions occur with the metallic impurities present in the acid to form compounds that contain substantial portions of the $P_2O_5$ in a form that is unavailable to the growing plant. Thus, for example, in U.S. Pat. No. 3,562,778, Siegel et al, assigned to the assignee of the present invention, it has been shown that if the ammoniation is carried out in such a manner that, first, a high proportion of the ammonia is fixed while the polyphosphate content is low, then the final dehydration of the orthophosphates is converted to polyphosphates in such a manner that the undesirable reactions that result in the formation of the unavailable $P_2O_5$ do not occur. As a result, Siegel et al teach a process wherein they can obtain substantially 100 percent $P_2O_5$ availability when the $R_2O_3:P_2O_5$ mole ratio in the wet-process phosphoric acid feed is as great as about 0.1.

In another example of improving upon the basic Getsinger process for ensuring both a high degree of availability of the total $P_2O_5$ content of ammonium polyphosphate product, while at the same time holding the ratio of ammonium polyphsophate to ammonium orthophosphate in said material as high as possible, there is shown in U.S. Pat. No. 3,733,191, R. S. Meline et al, and assigned to the assignee of the present invention, the further discovery that when utilizing the "T" in-line mixer, as in the process of Siegel et al, supra, the fixation of ammonia prior to dehydration and formation of the polyphosphate is most likely not the only essential mechanism of the reaction. Meline et al concluded that fixation of ammonia, dehydration, and polyphosphate formation must occur simultaneously in their improvement over the basic Getsinger process and the improvement of Siegel et al in order to yield products which consistently have the desired characteristics regardless of the impurity content when using wet-process phosphoric acid as feed acid to their process. In addition to Meline's use of what amounts to an instantaneous agitation on their mixing "T" to ensure intimate and immediate mixing at the point of initial fixation of the ammonia, they also teach a criticality of disengaging water vapor trapped in the foam resulting in their process of ammoniation of wet-process phosphoric acid prior to any substantial cooling thereof to ensure both high $P_2O_5$ availability and a high ratio of ammonium polyphosphate to ammonium orthophosphate in their product.

Thus, it may now be seen that, although the basic teaching of Getsinger is in fact a significant and substantial breakthrough which completely eliminates the necessity of first separately concentrating wet-process phosphoric acid from merchant-grade strength up to the superphosphoric acid range prior to the ammoniation thereof to produce ammonium polyphosphate products of highly desired characteristics, it also has been taught that, if the feed acid contains a high level of impurities, it is necessary either to fix substantial amounts of ammonia prior to the formation in the product of substantial amounts of ammonium polyphosphate, or to provide both severe and substantial instantaneous mixing to ensure that fixation of ammonia, dehydration of wet-process phosphoric acid so fixed with ammonia, and polyphosphate formation therein occur and that the foam resulting therefrom be mechanically treated to disengage water vapor trapped therein prior to any substantial cooling thereof in order to obtain products of the desired characteristics regardless of the impurity of the wet-process phosphoric acid fed to the system.

Although the two-stage ammoniation process of Getsinger is in fact a new and useful tool, and the contributions of Siegel et al and Meline et al, supra, possess considerable advantages thereover and in fact ensure an improved product therefrom regardless of the impurity content in the wet-process feed acid, the liquid products obtained by their processes contain all the impurities present in their feed wet-process acid. We have discovered a new and improved process that utilizes urea and relatively inexpensive impure wet-process phosphoric acid of any impurity level to produce very high-quality liquid fertilizers that exhibit substantially 100 percent $P_2O_5$ availabilities and that contain very few impurities in simple and inexpensive equipment without using the acid concentration step necessary in the teachings of Stiplin et al or Young, nor using the procedure taught by Getsinger, nor the involved procedure taught by Siegel et al, nor the mechanical requirements of Meline et al. By utilizing the condensing action of urea in urea phosphate to form polyphosphates, we have discovered a new, novel, and improved method of producing ammonium polyphosphate-type liquid fertilizers.

Thus, it may be seen that our process takes a considerably different approach from these prior-art methods of providing for the production of ammonium polyphosphate materials of both high polyphosphate and $P_2O_5$ availability levels from wet-process phosphoric acids having moderate to high impurity levels. In our process, since the condensing action of the urea is used to form polyphosphate, it is possible and desirable to operate at low temperatures where $P_2O_5$ availability problems are not encountered but at temperatures where we still obtain a product having a high polyphosphate content, wherein in the prior art this has not heretofore been possible.

The use of urea as a condensing agent per se is not unknown. A rapid search of the literature has revealed several patents or articles in which urea has been used as a condensing agent to form certain polyphosphates. For example, three patents issued to Monsanto Company,[1,2,3] describe the production and use of long-chain water-insoluble ammonium polyphosphates by heating urea and ammonium orthophosphate or polyphosphate. These products, however, would not be suitable for use in preparation of clear liquid fertilizers.
[1]Belgian Pat. No. 674,161, Dec. 22, 1965.
[2]Beltian Pat. No. 677,866, Sept. 12, 1966.
[3]Netherlands application 6,409,323, Aug. 13, 1964.

In other work, Ueda[4,5] heated phosphoric acid and urea to form a mixture of highly condensed ammonium polyphosphate and water-insoluble cyanuric acid with several subsequent steps involving water and ethyl alcohol addition to separate the polyphosphate. It is well known that to form cyanuric acid along with the polyphosphates, drastic reaction conditions must be used. When such drastic reaction conditions are used, the resultant polyphosphates are of the long-chain variety, which Ueda teaches tend to become less crystalline as their chain length increases and are sparingly soluble. Ueda teaches that gels formed when he attempted to produce a concentrated solution from his products. A solution containing gels would not present an acceptable appearance as a high quality clear liquid fertilizer and the gels would tend to clog application equipment that is normally used to distribute clear liquid fertilizers on the field. Stinson (U.S. Pat. No. 3,540,874, assigned to the assignee of the present application) teaches that urea may be used as a condensing agent to form ammonium polyphosphate liquid fertilizers from impure wet-process phosphoric acid. Highly desirable products can be produced by the procedures described by Stinson, but the procedures are complicated and involve many steps. Furthermore, the final products obtained by Stinson's method contain all of the impurities originally present in the starting wet-process phosphoric acid and as a result have limited usefulness. Smith (U.S. Pat. No. 3,941,896) teaches the formation of modified ammonium polyphosphates by heating mixtures of urea and phosphoric acids but also includes as a necessary part of the process the incorporation of "a compound selected from sulfuric acid, boric acid, boric oxide, phosphorous acid, sulphurous acid and the sodium, potassium, calcium, urea, and ammonium salts of said compounds." Our new and novel process for the production of urea-ammonium polyphosphate is less complicated than that described by Stinson and does not require the incorporation of an additive as taught by Smith.
[4]Udea, Shiro, Oyama, Keiji, and Koma, Kenju Kogyo Kagaki Zasshi 66(5) 586-9 (1963).
[5]Ueda, Shiro, Nakagawa, Tatsuro, and Koma, Kenju Kogyo Kagaku Zasshi 66(5) 589-92 (1963).

Poynor (U.S. Pat. No. 3,723,086) teaches that dissolution of small amounts of urea in wet-process acid prior to ammoniation of the acid in a confined reaction zone, such as a pipe reactor, reduces the amount of water-insoluble ammonium polyphosphates formed. Poynor, however, specifically limits the amount of urea utilized because of "problems in foaming and thickening of the resultant product" and is not concerned with the formation of polyphosphates by condensation of orthophosphates with the added urea. In fact, our studies have revealed that reaction of urea with phosphoric acid, with or without the presence of ammonia, in a confined space is not conducive to the condensation of orthophosphate with urea; instead, the urea is hydrolyzed by contact with the water in the acid and very little polyphosphate is formed by the condensation reaction.

Rohlfs (U.S. Pat. No. 3,419,349) teaches that ammonium polyphosphate can be produced by heating urea phosphate but specifically excludes the possibility of utilizing urea phosphate alone as we teach. He specifies that also present must be "at least one member selected from the group consisting of (I) an ammonium-orthophosphate, II, a mixture thereof with an amount of phosphoric acid such that at most four phosphorus atoms are present for each ammonium equivalent."

In U.S. Pat. No. 3,713,802, issued to Ugine Kuhlmann, Gittenait describes a continuous-type procedure for production of urea phosphate and for utilizing urea phosphate for producing liquid and solid urea-ammonium polyphosphate. However, he specifies that the process "combines the chemical reactions between phosphoric acid, urea, and ammonia in such a manner that the overall thermal balance provides an excess, thus making it possible to operate under autothermal conditions" and the "preferred embodiment of the invention" results in a reaction product which contains from 50 to 70 percent of the $P_2O_5$ as polyphosphate. Nowhere does Gittenait indicate that it was possible to form less than 50 percent polyphosphate likely because of the amount of exothermic heat of reaction liberated by ammoniation of the dry urea phosphate crystals. The equipment described by Gittenait to produce this reaction product is unnecessarily complex; ammonia must be introduced in two locations and because of the "autothermal conditions" provided, specifically excludes the production of products of polyphosphate contents lower than 50 percent. Gittenait infers that batch operation is possible; however, when we attempted to ammoniate a batch of crystalline urea phosphate in a tank-type reactor, we found it was not an possible to stir the dry crystals with a stirrer, and consequently a large amount of the ammonia added was lost to the atmosphere. This was obviously not an acceptable mode of operation. From this, it was apparent to those skilled in the art that Gittenait's inference was either inaccurate or else not complete. We did make additional tests, but first added sufficient water to the reactor to provide fluidity to the crystalline urea phosphate and when we began ammoniation, the temperature of the mixture did increase and we were able to produce a molten urea ammonium polyphosphate without loss of ammonia and which did contain some (2 percent) polyphosphate. This amount of polyphosphate formed by a usual batch operation when water was added to impart fluidity was not enough to allow the impurities that remained in the starting urea phosphate to be sequestered for more than a week or so. Evidently, the lack of polyphosphate formation was caused by the large amount of free water that was required to provide fluidity, which reacted with the urea, as shown in the following equation, resulting in the urea being hydrolyzed, but not in a manner that would cause condensation of the orthophosphate to polyphosphate.

$$H_2O + (NH_2)_2CO \rightarrow 2NH_3 + CO_2$$

As discussed later, we were eventually able to modify the batch procedure and increase the polyphosphate content to above 10 percent, which was usually enough polyphosphate to produce a liquid that could be stored for at least 3 weeks or longer, which was judged to be long enough to be considered acceptable. Using a standard batch procedure, other tests were made in which a sufficient amount of a previously produced urea-ammonium polyphosphate liquid of 15-28-0 grade, which contained only about one-third water, was added to the crystalline urea polyphosphate to provide fluidity. Results from these tests are described in detail later and show that in our new, novel, and improved process utilizing less complex reaction equipment, we are able to produce satisfactorily clear urea-ammonium polyphosphate liquids of low-impurity content that contain up to 50 percent polyphosphate with all heat supplied to the process from ammoniation of the urea phosphate. Attempts to produce a higher level of polyphosphate were unsuccessful because of high ammonia losses which would be unacceptable by today's OSHA standards. The polyphosphate level of our products is in the range specifically excluded as possible by Gittenait. Our process, as described infra, will overcome the disadvantages of Gittenait and still allow production of materials with excellent chemical properites.

Gittenait states that heat is evolved when urea phosphate is ammoniated in the absence of water and that polyphosphate is formed thereby but the polyphosphate content produced is only in the range of 50-98 percent of the total phosphate percent. He accomplished the polyphosphate formation, as discussed in more detail infra, however, only by carrying out the formation in the absence of water and by the addition of significant excesses of ammonia. In addition, Gittenait produced urea-ammonium polyphosphate liquid that had a high vapor pressure of ammonia and that could not be handled or stored without a significant loss of ammonia, as shown in our Example III, infra.

In German Pat. No. 2,308,408, issued to Badisch Aniline and Soda Factory, AG, Aug. 29, 1974, Theobald utilizes urea phosphate and the known condensing action of urea to form polyphosphates, but specifies that the process must be carried out in two stages where the crystals are melted in the first stage and then pyrolyzed into polyphosphates in the second stage. Theobald specifically excludes the possibility of carrying out the process in a single heating stage. Furthermore, he states that approximately 100 kcal/kg of urea phosphate is required in his heating step. Our process, as subsequently described herein, requires less equipment and will overcome the disadvantage of the two-stage process; in addition, our process can operate with no supplemental heat input.

Recently, Stinson et al (patent application Ser. No. 883,990, filed Mar. 6, 1978, and assigned to the assignee of the present invention) disclosed a process employing the urea in urea phosphate as a condensing agent and which involved production of urea-ammonium polyphosphate by heating crystalline urea phosphate in one stage to ultimately produce a liquid fertilizer of the clear solution type. This process is characterized by the fact that the resulting product has relatively high contents of nitrogen and $P_2O_5$ and $P_2O_5$ availability and can have high or low proportions of the $P_2O_5$ as polyphosphate depending upon the pyrolysis conditions chosen. Also, Stinson teaches that the adjustment of the urea:biuret ratio by adding supplemental urea to the said liquid products prevents biuret precipitation in the polyphosphate-containing solutions. In this patent application, Stinson discloses that pyrolysis of urea phosphate may be carried out on a batch basis but the heat required initially to start the operation is supplied by steam or other means rather than ammonia.

Our invention is simpler than Stinson et al 883,990, supra, in that no supplemental heat is required which makes our process more practical from an energy conservation standpoint. Furthermore, a liquid production vessel is not required as both pyrolysis and dissolution takes place in the same vessel. Still furthermore, our process allows such urea-ammonium polyphosphate liquid fertilizers to be produced in existing equipment that may be commonly available at both large and small fertilizer plants without major modification or expense.

It is therefore an object of the present invention to produce clear, stable liquid fertilizers containing upwards to about 43 percent total plant food ($N + P_2O_5$) by a batch-type process that uses urea in urea phosphate as a condensing agent to form polyphosphate and in which the necessary heat is supplied from ammoniation of the urea phosphate and from which process liquid fertilizers are produced which form substantially no precipitate upon standing and storage.

A further object of the present invention is to produce clear, stable liquid fertilizers containing upwards to about 43 percent total plant food ($N+P_2O_5$) by pyrolyzing urea phosphate in a single vessel utilizing the condensing action of urea such that ammonium polyphosphate is formed, and the resulting liquid fertilizer from said process produced by adding the water of formulation and an additional small amount of ammonia to the hot ammonium polyphosphate melt in the same vessel.

A still further object of the present invention is to produce clear, stable liquid fertilizers containing upwards to about 43 percent total plant food ($N+P_2O_5$) by pyrolyzing urea phosphate in a single vessel utilizing the condensing action of urea such that at the reaction conditions used, up to about one-half of the orthophosphate is condensed to polyphosphate to form ammonium polyphosphates, said process characterized by the resulting liquid having high contents of nitrogen and $P_2O_5$, all of which are in available form.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without deparing from the true spirit and scope of the present invention.

Our invention, together with further objects and advantages will be better understood from a consideration of the following description taken in connection with the accompanying drawing in which.

The process of the present invention involves the production of urea-ammonium polyphosphate by batch-type pyrolysis of urea phosphate wherein the heat required for the pyrolysis is derived from the heat of reaction generated by ammoniation of the phosphoric acid component in urea phosphate, $CO(NH_2)_2 \cdot H_3PO_4$. The urea-ammonium polyphosphate melt formed from the pyrolysis reaction is dissolved in water and some additional ammonia added to yield high-purity urea-ammonium polyphosphate liquids. The general equation for the production of urea-ammonium polyphosphate liquids of 25 percent polyphosphate level wherein heat for the pyrolysis of urea phosphate is supplied from the heat of ammoniation can be written:

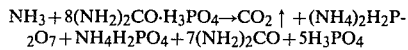

$NH_3 + 8(NH_2)_2CO \cdot H_3PO_4 \rightarrow CO_2 \uparrow + (NH_4)_2H_2P_2O_7 + NH_4H_2PO_4 + 7(NH_2)_2CO + 5H_3PO_4$ Ammonia for the ammoniation of the urea phosphate is derived from added ammonia and from the ammonia formed from decomposition of urea during the condensation reaction.

It is possible to incorporate other nutrients such as primary nutrients, secondary nutrients, or micronutrients in the pyrolysis or to the finished liquid.

Figure 1:
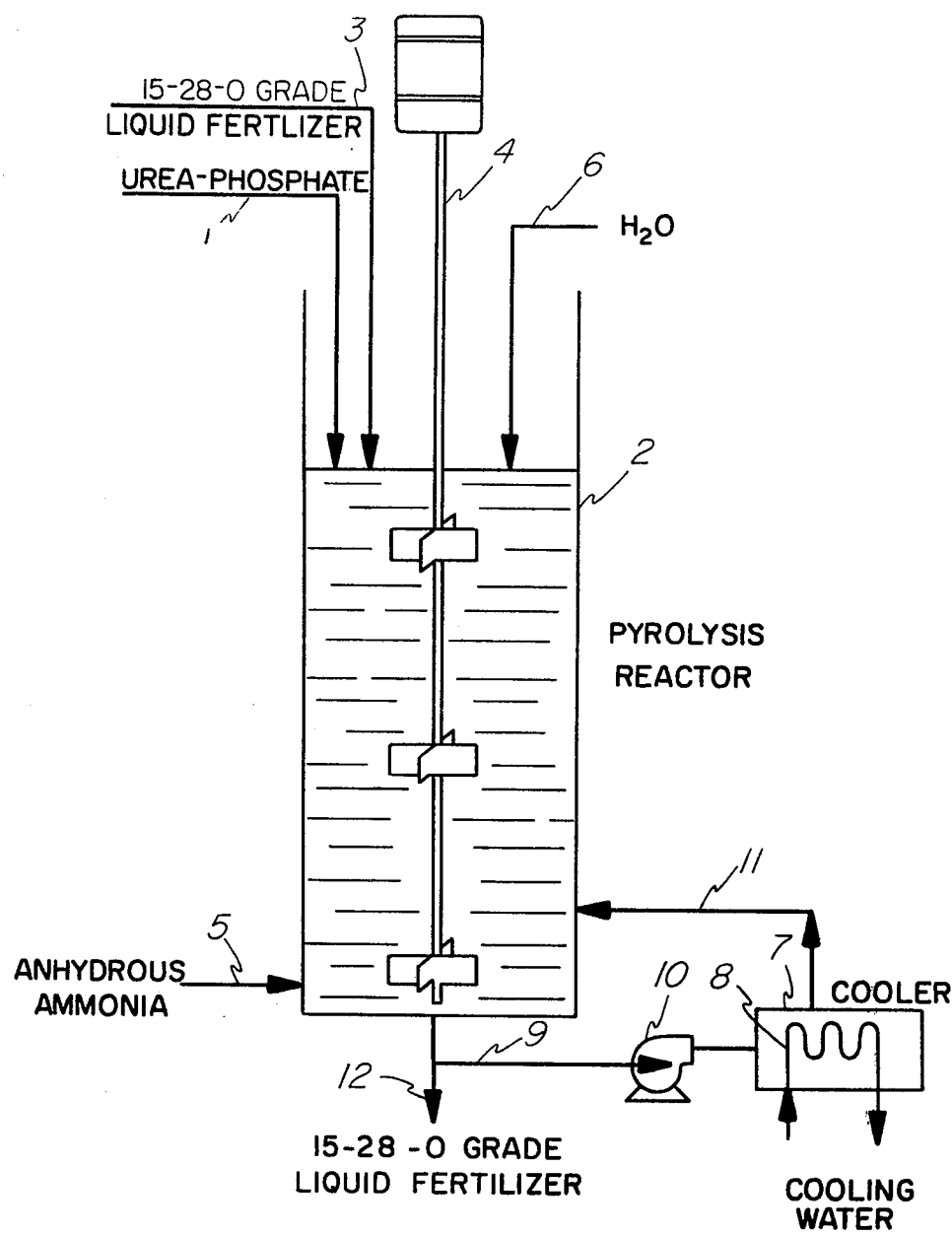
FIG. 1 is a flowsheet illustrating the principle utilized in carrying out our invention in the production of liquid fertilizers.

Referring now more specifically to FIG. 1 in which urea-ammonium polyphosphate liquids are produced, a preweighed portion of either at least one-fourth (hereafter referred to as batch-continuous process) or all crystalline urea phosphate (hereafter referred to as batch process) obtained from a source not shown is added via line 1 to pyrolysis vessel 2. Liquid such as previously produced 15-28-0 is also fed from a source not shown via line 3 into pyrolysis vessel 2. The 15-28-0 is added for the purpose of initially providing fluidity for agitation purposes. Pyrolysis vessel 2 is equipped with a motor-driven agitation apparatus 4 running at such speed as to secure rapid and intimate mixing of the constituents in the reactor and to enable release of $CO_2$, which is formed during the condensation reaction, to the atmosphere. Proper design and operation of the agitation apparatus is necessary so that the $CO_2$ and any water vapor formed may be released without causing an undue amount of foam while allowing the ammonia to be fixed without loss. In some instances, although not shown in FIG. 1, it may be necessary to include a foam breaker in the agitation apparatus to control foaming. Anhydrous ammonia from a source not shown is added to the urea phosphate -15-28-0 mixture through a metering system not shown via line 5 into pyrolysis vessel 2 to supply the heat for pyrolysis of the urea phosphate. On obtaining the desired test temperature, the remainder, if any, of the crystalline urea phosphate is fed from a source not shown via line 1 at controlled rates into pyrolysis vessel 2 through feeding and metering means not shown. The anhydrous ammonia flow through line 5 is reduced to such a rate that no ammonia is evolved from pyrolysis vessel 2. After the desired amount of polyphosphate is formed, the preweighed water of formulation from a source and means not shown is added rapidly via line 6 into pyrolysis vessel 2 to quench the hot melt therein and to produce liquid fertilizer of the desired grade. If the liquid is low in pH, additional anhydrous ammonia may be added via line 5 to adjust the liquid to its desired pH. The liquid fertilizer is then further cooled by circulation through a cooler. One type of cooler that is suitable is illustrated as vessel 7, which is a tank-type unit equipped with cooling coil 8. The urea-ammonium polyphosphate liquid flows from pyrolysis vessel 2 via line 9 through pump 10 into cooler 7 and then the cooled liquid flows via line 11 back to pyrolysis vessel 2. The temperature in the cooler is controlled by varying the flow of cooling water from a source and by a metering means not shown through coil 8 and by controlling the flow of liquid fertilizer through cooler 7 by controlling the speed of pump 10. After cooling to the desired temperature, product liquid fertilizer then is removed from the pyrolysis vessel 2 via line 12 into any suitable means for storage.

Referring again more specifically to FIG. 1, as well as to FIGS. 2 and 3, our experimental studies have shown that contrary to the teachings of Gittenait, who specified that ammonia must be added in two locations to the urea phosphate and that the polyphosphate level of the urea-ammonium polyphosphate liquids produced must be above 50 percent of the total phosphate, we can produce urea-ammonium polyphosphate liquids of essentially any polyphosphate level below 50 percent with addition of ammonia at only one location under conditions where there is no loss of ammonia and in one stage. Two detailed examples of this are described below; in the first example, a product that contained 25 percent of the total phosphate as polyphosphate was made while in the second example, a product that contained 49 percent of the total phosphate as polyphosphate was produced.

EXAMPLE I

Figure 2:
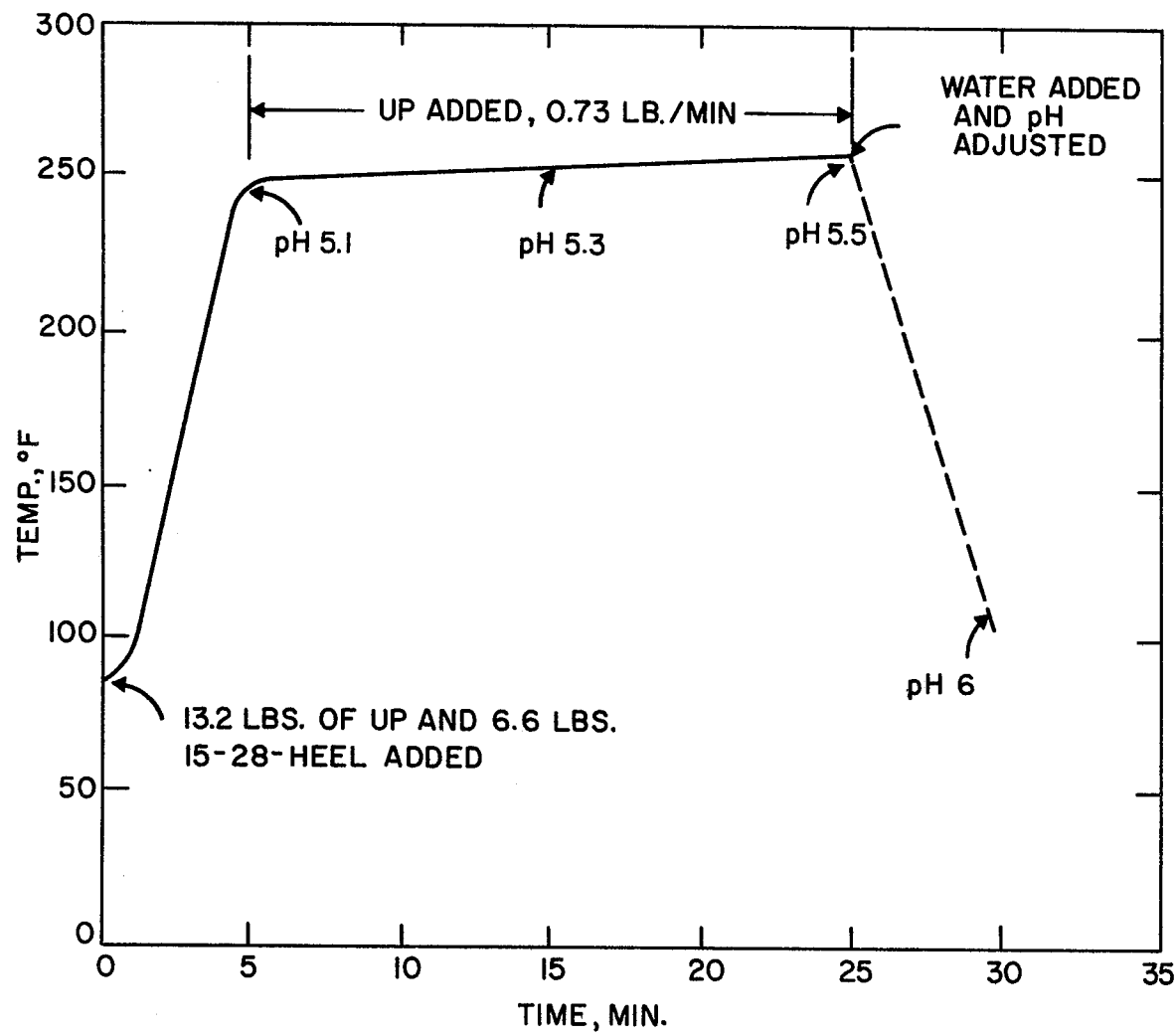
FIG. 2 is a graphical illustration of the conditions that exist during the batch-type pyrolysis of urea phosphate to form urea-ammonium polyphosphate of 25 percent polyphosphate level.

In making the batch-continuous test illustrated in FIG. 2, 13.2 pounds of urea phosphate (half of total needed to produce a batch) and 6.6 pounds of previously produced 15-28-0 liquid fertilizer (heel) were introduced into a 5-gallon-capacity vessel open to the atmosphere and equipped with an agitator and ammonia sparger. The mixture, while being stirred, was slowly ammoniated at a rate of 0.06 pound of ammonia per minute for 1 minute until the mixture was completely fluid; then, the ammonia rate was increased to 0.39 pound per minute for 4 minutes until a temperature of 250° F. to 260° F. was reached. At this point the urea phosphate feeder was started and 14.5 pounds of urea phosphate was fed at a rate of 0.73 pound per minute over a period of about 20 minutes. At the same time that the urea phosphate feeder was started, the ammonia rate was reduced to 0.035 pound per minute. The ammonia flow was maintained at this lower rate while the urea phosphate was added. The temperature in the reactor during this time ranged between about 250° F. to 260° F. and the final melt pH was 5.5.

No ammonia odor was noted over the reactor during ammoniation. The water of formulation (14.4 pounds) was then added rapidly to the reactor to quench and dissolve the hot melt. Additional anhydrous ammonia (0.2 pound) was then added to raise the pH to 6 which is about the point of maximum solubility. The liquid was then cooled quickly to about 100° F. A liquid of 15.9-27.8-0 grade that contained 25 percent of the phosphate as polyphosphate was produced.

EXAMPLE II

Figure 3:
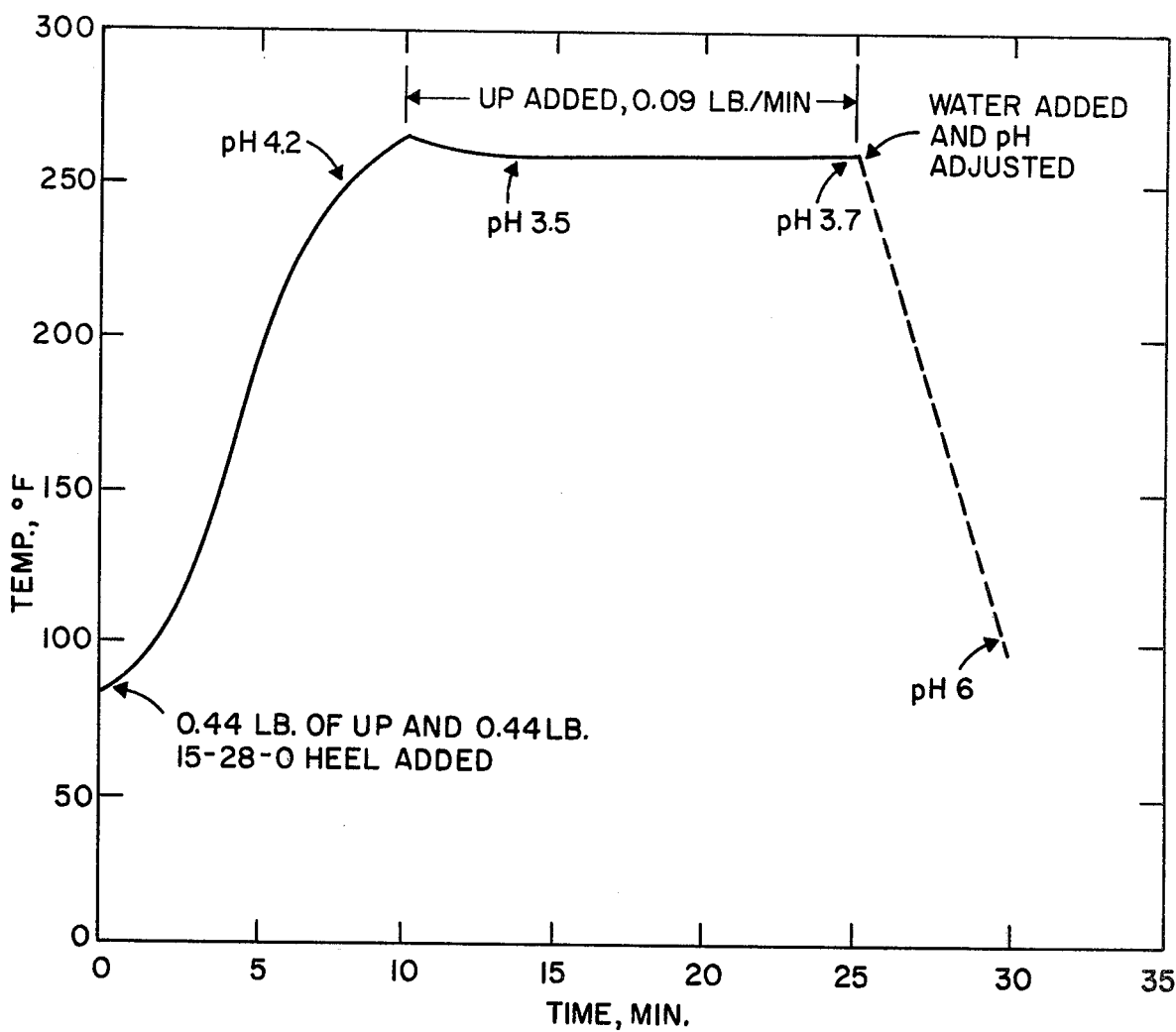
FIG. 3 is a graphical illustration of the conditions that exist during the batch-type pyrolysis of urea phosphate to form urea-ammonium polyphosphate of 50 percent polyphosphate level.

In this test, illustrated in FIG. 3, 0.44 pound of urea phosphate (one-fourth of total needed to produce a batch) and 0.44 pound of previously produced 15-28-0 liquid fertilizer (heel) were introduced into a 0.5-gallon-capacity vessel equipped with an agitator and ammonia sparger. The mixture was then ammoniated at a constant rate of 0.02 pound ammonia per minute for a period of about 10 minutes until a temperature of 260° F. was reached. At this point, an additional 1.32 pounds of urea phosphate was fed to the vessel at a rate of 0.09 pound per minute. At the same time the ammonia rate was reduced to 0.003 pound per minute. Operation was continued in this manner for 15 minutes after which time the urea phosphate feeder was stopped and ammonia shut off. The temperature in the vessel during the period ranged from 250° to 270° F. and the final melt pH was 3.7. No ammonia odor was noticed during ammoniation. The water of formulation (0.8 pound) was then added rapidly to the reactor to quench and dissolve the hot melt. Additional anhydrous ammonia (0.01 pound) was then added to increase the pH to 6, which is about the point of maximum solubility. The liquid was then cooled quickly to about 100° F. by circulating through a water-cooled bath.

A liquid of 16.8-30.3-0 grade containing 49 percent of the phosphate as polyphosphate was produced. The liquid was then cooled quickly to about 100° F. by circulating through a water-cooled bath. Dilution of the liquid with appropriate amount of water would give a liquid of 15-28-0 grade.

EXAMPLE III

The following negative example is presented to further illustrate the desirability of using our new batch ammoniation procedure over the Gittenait two-step ammoniation procedure for the production in situ of urea-ammonium polyphosphate. This information is given by way of illustration and not by way of limitation. The maximum solubility with respect to urea and ammonium phosphate precipitation of liquids produced by our process occurs when the liquids contain 6.5 to 7 pounds $NH_3$ per unit $P_2O_5$ and have a pH in the range of 6-6.2. In addition, we have found that the maximum grade that is soluble at 32° F. (0° C.) is also dependent upon the polyphosphate content, as is shown in the following tabulation.

| % polyphosphate | Maximum grade soluble at 32° F. | % N + $P_2O_5$ |
|---|---|---|
| 0 | 10-16-0 | 26 |
| 25 | 14-23-0 | 37 |
| 50 | 15-28-0 | 43 |
| 75 | 14-30-0 | 44 |

In comparison, the liquid produced by Gittenait's procedure outlined in Example I of his U.S. Pat. No. 3,713,802 contained 16.5 percent N and 30 percent $P_2O_5$; the ammonia nitrogen content was equivalent to 7.9 pounds of ammonia per unit $P_2O_5$ which is an excess of ammonia. Although this is not mentioned in his teachings, a liquid with this degree of ammoniation would have a high pH (we estimate about 7.3) and would have a high loss of ammonia.

Further outlined in Gittenait's example is the feed proportions of urea phosphate and ammonia to the reactor. He stated that he charged 101 kilograms urea phosphate (17.4-44-0) and 9.5 kilograms gaseous ammonia and from which 97 kilograms of urea-ammonium polyphosphate melt was produced with an analysis of 24.8-45.7-0. A material balance calculation of his inputs indicated that the melt grade should have been 26.15-45.81-0. Therefore, by calculation, a 1.33 kilogram loss of input N, which is about 5 percent of the input N to the process, apparently occurred. Liquids produced by our new and improved process do not have a loss of input N which is an obvious economic as well as environmental advantage for our process.

Other experimental work showing selected tests to illustrate the range that our new, improved and simplified process can be operated under is shown in tables I and II, infra. Also shown in these tables are data showing that water and ammonium hydroxide can be used as the heel instead of 15-28-0. However, if the usual batch procedure is used, liquids containing only about 2 percent polyphosphate will be made as shown in table I, tests 2/24/78C and 2/22/78, as compared to approximately 13 percent polyphosphate when 15-28-0 is used. As mentioned earlier, evidently the lack of polyphosphate formation was caused by the large amount of free water that was required to provide fluidity, which reacted with the urea, resulting in the urea being hydrolyzed, but not in a manner that would cause condensation of the orthophosphate to polyphosphate. About 10 percent polyphosphate is thought to be about the minimum amount required to produce liquids that will remain precipitate free for at least 3 weeks, which is usually long enough for the producer to move his products to the field. If the batch procedure is modified somewhat, it has been found that water and likely ammonium hydroxide could still be used to provide fluidity and make a product containing somewhat more than 10 percent polyphosphate, but in no cases, because of the larger amount of free water present, would the polyphosphate content be higher than that produced with 15-28-0. This modified batch procedure is listed in table I as a batch-continuous procedure and consists of adding only a portion of the total urea phosphate charge at the start of the test. In our work, we have used as little as one-fourth to one-half of the total charge as urea phosphate and added it at the start of the test, along with the heel, which can be either water, ammonium hydroxide, or 15-28-0. In making the liquid, this UP heel mixture is ammoniated rapidly at a constant ammonia rate until the temperature in the reactor reaches approximately 250°-260° F. Then the ammonia rate is reduced somewhat and the remaining urea phosphate is added at a controlled rate over an extended period of time which in tests 9/28/77A and 2/24/78D was about a 15-minute period. At the end of this 15-minute period when water was the heel, the melt that was produced was processed into a liquid in the manner described previously and it contained 21 percent polyphosphate. It is postulated that if ammonium hydroxide were used instead of water, a liquid of similar polyphosphate content could be made. Comparing the batch-continuous test where water was the heel with test 9/28/77A in table II again shows that more polyphosphate will be made with 15-28-0 instead of water. Thus, by virtue of carrying out the pyrolysis in one stage, we are able (as shown in tables I and II infra) to produce liquids not under "autothermal conditions" and not which contain 50 percent polyphosphate or more as specified by Gittenait, but which range in polyphosphate content from about 10 percent to about 50 percent by varying the amount of heat input, not from an "autothermal" source, but by varying the time in the pyrolysis reactor over which ammonia is added to supply heat from the heat of reaction of the ammonia and the urea phosphate. Thus, our new and improved process allows us to form under controlled conditions urea-ammonium polyphosphate that contains polyphosphate contents in the range not visualized as possible by Gittenait.

TABLE I

Urea-Ammonium Polyphosphate from Crystalline Urea Phosphate[a]
Followed by Production of Liquids from the Hot Melt

| Test No. B-UAP | 12/7/77D | 9/28/77A | 2/24/78C | 2/24/78D | 2/22/78 |
|---|---|---|---|---|---|
| Urea phosphate crystals fed CUP | | | | | |
| Batch pyrolysis reactor[b] | 54PP | 61PP | 54PP | 54PP | 54PP |
| General operating conditions | | | | | |
| Type operation | Batch | Batch-continuous | Batch | Batch-continuous | Batch |
| Initial charge, lbs. | | | | | |
| Heel | 0.66(15-28-0) | 0.44(15-28-0) | 0.66($H_2O$) | 0.33($H_2O$) | 0.66($NH_4OH$) |
| UP | 2.64 | 0.44[d] | 2.64 | 1.32[d] | 2.64 |
| $NH_3$ added during test, lb. | 0.21 | 0.11 | 0.21 | 0.21 | 0.15 |
| Average test temp., °F. | 260 | 260 | 250 | 250 | 250 |
| Retention time at test temp., min. | 0 | 15 | 0 | 15 | 0 |
| Maximum temp., °F. | 260 | 273 | 256 | 261 | 250 |
| Time to reach test temp., min. | 9.5 | 8.5 | 12 | 14 | 11 |
| UAPP melt pH (10% solution) | 5.0 | 3.7 | 5.85 | 5.2 | 5.95 |
| Liquid fertilizer | | | | | |
| Total batch time (pyrolysis + liquid production), min. | 15 | 25[c] | 15 | 34 | 13 |
| Discharge composition % by wt. | | | | | |
| Grade | 14.0-22.8-0 | 16.8-30.3-0 | 15.2-23.1-0 | 15.7-24.9-0 | 14.7-22.1-0 |
| % of total $P_2O_5$ as polyphosphate | 13 | 49 | 2 | 21 | 2 |
| Biuret | 0.1 | 0.1 | Nil | 0.1 | Nil |
| $NH_3$—N | 6.6 | 8.6 | 6.3 | 7.2 | 6.7 |
| Lb. $NH_3$/unit $P_2O_5$ | 7.0 | 6.9 | 6.6 | 7.0 | 6.6 |
| Lb. urea/100 lb $P_2O_5$ | 70 | 56 | 83 | 73 | 78 |
| pH (undiluted) | 6.0 | 5.9 | 5.85 | 6.4 | 5.95 |
| Density, g/ml, at 80° F. | 1.290 | 1.384 | 1.286 | 1.318 | 1.3 |
| Precipitate free - storage time at 80° F., wks. | 16 | 24 | Less than 2 | 20 | Less than 2 |

Note:
[a]Produced from unconditioned urea and wet-process merchant-grade acid derived from uncalcined phosphate rock. Analysis as follows:

| Test No. CUP- | % by wt. | | | | | | | | | Av crystal size (microns) | Av reduction in impurity level (Al, Fe, Mg, F)% | Lb urea/ 100 lb $P_2O_5$ |
|---|---|---|---|---|---|---|---|---|---|---|---|---|
| | Total N | Total $P_2O_5$ | $Fe_2O_3$ | $Al_2O_3$ | $SO_4$ | F | MgO | Biuret | $H_2O$ | | | |
| 54PP | 17.3 | 43.5 | 0.11 | 0.16 | 0.3 | 0.09 | 0.07 | Nil | 2.1 | 600 | 87 | 86 |
| 61PP | 17.5 | 44.0 | 0.08 | 0.15 | 0.4 | 0.07 | 0.09 | Nil | 0.5 | 620 | 90 | 85 |

[b]5-inch I.D. vessel, quiescent volume 1600 cc.
[c]Does not include cooling time.
[d]1.32 additional pounds of UP added after reactor temperature reached about 260° F.

TABLE II

Urea-Ammonium Polyphosphate from Crystalline Urea Phosphate[a]
Followed by Production of Liquids from the Hot Melt

| Test No., B-UAP | 7/26A | 9/26B | 8/4B | 8/2D | 8/18C |
|---|---|---|---|---|---|
| Batch pyrolysis reactor[b] | ← | ← | Batch-continuous | → | → |
| General Operating conditions | | | | | |
| Initial charge | | | | | |
| Heel (15-28-0), lb | 6.6 | 6.6 | 6.6 | 6.6 | 6.6 |
| UP | 13.2[d] | 13.2[d] | 13.2[d] | 13.2[d] | 13.2[d] |
| $NH_3$ added during test, lb./min. | ← | ← | −.04–0.39 | → | → |
| Average test temperature, °F. | 260 | 260 | 260 | 260 | 260 |
| Retention time at test temp., min. | 5 | 10 | 15 | 20 | 30 |
| Maximum temp., °F. | 261 | 268 | 270 | 278 | 266 |
| Time to reach test temp., min. | 5 | 5 | 5 | 5 | 12 |
| UAPP melt pH (10% solution) | 5.2 | 5.2 | 5.2 | 5.5 | 5.4 |
| Liquid Fertilizer | | | | | |
| Total batch time,[c] min. | 15 | 25 | 30 | 35 | 55 |
| Discharge composition % by wt. | | | | | |
| Grade | 15.6-27.8-0 | 15.0-27.3-0 | 15.7-28.7-0 | 16.2-28.7-0 | 16.1-30.5-0 |
| % of total $P_2O_5$ as polyphosphate | 11 | 16 | 19 | 29 | 44 |
| Biuret | 0.1 | 0.1 | 0.1 | 0.1 | 0.1 |
| $NH_3$—N | 7.2 | 7.1 | 7.7 | 7.8 | 8.1 |
| Lb. $NH_3$/unit $P_2O_5$ | 6.3 | 6.3 | 6.5 | 6.6 | 6.5 |
| Lb urea/100 lb $P_2O_5$ | 65 | 62 | 60 | 63 | 56 |
| pH (undiluted) | 6.0 | 6.3 | 6.2 | 6.2 | 6.2 |
| Density g/ml, at 80° F. | 1.325 | 1.328 | 1.341 | 1.344 | 1.352 |
| Precipitate free-storage time at 80° F., weeks | 3–16 | 3–16 | 3–16 | 3–16 | 20–24 |

Note:

[a] Produced from unconditioned urea and wet-process merchant-grade acid derived from uncalcined phosphate rock. Analysis as follows:

| Test No. CUP- | % by wt. | | | | | | | | | Av. crystal size (microns) | Av. reduction in impurity level (Al,Fe,Mg,F) % | Lb. urea/ 100 lb. $P_2O_5$ |
|---|---|---|---|---|---|---|---|---|---|---|---|---|
| | Total N | Total $P_2O_5$ | $Fe_2O_3$ | $Al_2O_3$ | $SO_4$ | F | MgO | Biuret | $H_2O$ | | | |
| 61PP | 17.5 | 44.0 | 0.08 | 0.15 | 0.4 | 0.07 | 0.09 | Nil | 0.5 | 620 | 90 | 85 |

[b] 9-in. I.D. vessel, quiescent volume, 5 gal.
[c] Pyrolysis + liquid production.
[d] 14.5 additional pounds of UP added after reactor temperature reached about 250-260° F.

After sifting and winnowing through the data, results, and operations of our new and improved method for producing urea-ammonium polyphosphate liquids, we now present in Table III below the operating range, preferred range, and most preferred range for operation of the process described in FIG. 1, supra.

TABLE III

| | General operating range | Preferred | | Most preferred | |
|---|---|---|---|---|---|
| | | Batch | Batch continuous | Batch | Batch continuous |
| Heel charge to batch reactor % by wt. of total batch | 5–30 | 13–20 | 10–20 | 13–15 | 10–15 |
| Urea phosphate, initial charge to reactor, % of total UP added | 25–100 | 100 | 25–75 | 100 | 25–50 |
| Pyrolysis conditions | | | | | |
| Temperature, °F. | 220–300 | 245–280 | 220–300 | 250–275 | 250–275 |
| Retention time, min. at maximum temp. | 1–60 | 1–5 | 5–45 | 1–3 | 15–30 |
| Total batch time, min | 6–61 | 6–30 | 6–46 | 6–30 | 16–31 |
| Liquid composition | | | | | |
| Total N, % | 10–15 | 12–15 | 12–15 | 12–14 | 14–15 |
| Total $P_2O_5$, % | 16–30 | 18–28 | 23–29 | 18–26 | 23–28 |
| % of total $P_2O_5$ as polyphosphate | 10 up to about 50 | 10 up to about 50 | 10 up to about 50 | 10–30 | 20 up to about 50 |
| Density | 1.2–1.4 | 1.25–1.35 | 1.25–1.35 | 1.3–1.35 | 1.3–1.35 |
| pH | 5.5–7.0 | 6.0–6.5 | 5.7–6.8 | 6.0–6.5 | 6.0–6.5 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A batch process for the production of high-purity urea ammonium polyphosphate liquid which process consists essentially of the steps of:

(1) combining a predetermined portion of crystalline urea phosphate in a reaction vessel together with a predetermined portion of said high-purity urea-ammonium polyphosphate liquid, said predetermined portion of said urea-ammonium polyphosphate liquid being of sufficient quantity to impart fluidity into the resulting mixture of same with said crystalline urea phosphate;

(2) subsequently introducing into said reaction vessel a predetermined quantity of anhydrous ammonia, said predetermined quantity of anhydrous ammonia being sufficient to provide heat of reaction to raise the temperature of the resulting mixture in said reaction vessel from about the ambient temperature of the materials introduced thereinto up to the range of about 220° F. to about 300° F. to effect the condensation of said urea phosphate and thereby yield a resulting melt of urea-ammonium polyphosphate, and said predetermined quantity of anhydrous ammonia limited so as to substantially eliminate loss of unreacted portions thereof from said reaction vessel;

(3) subsequently adding water to said reaction vessel in predetermined quantities sufficient to dissolve said urea-ammonium polyphosphate to effect the production of a high-purity urea-ammonium polyphosphate liquid;

(4) subsequently subjecting at least a portion of said high-purity urea-ammonium polyphosphate liquid to cooling means; and (5) subsequently removing at least a portion of the resulting cooled high-purity urea-ammonium polyphosphate liquid from said reaction vessel as product.

2. The process of claim 1 wherein subjecting the urea ammonium polyphosphate liquid to cooling means is effected in a vessel separate from said reaction vessel.

3. The process of claim 2 wherein said predetermined portion of said high-purity urea-ammonium polyphosphate liquid fed into said reaction vessel ranges from about 13 percent to about 20 percent by weight of said resulting high-purity urea-ammonium polyphosphate liquid removed from said reaction vessel, and wherein the predetermined quantity of water added to said reaction vessel is sufficient to produce a high-purity urea-ammonium polyphosphate liquid assaying from about 18 percent to about 28 percent by weight $P_2O_5$.

4. The process of claims 1 or 3 wherein a stream of ammonia is added to said reaction vessel during cooling step (4) thereof in quantity sufficient to adjust the pH of the high-purity urea ammonium phosphate liquid therein to the range from about 6 to about 6.5, said pH adjustment characterized by the fact that the maximum solubility of the product liquid is effected.

5. The process of claim 4 wherein the heat of reaction of the anhydrous ammonia increases the temperature of the resulting molten mixture in said reaction vessel up to the range of about 245° F. to about 280° F., thereby resulting in a product urea ammonium polyphosphate liquid containing from about 10 percent to about 50 percent polyphosphate.

6. The process of claim 1 wherein said predetermined portion of said high-purity urea-ammonium polyphosphate liquid fed into said reaction vessel ranges from about 13 percent to about 20 percent by weight of said resulting high-purity urea-ammonium polyphosphate liquid removed from said reaction vessel, and wherein the predetermined quantity of water added to said reaction vessel is sufficient to produce a high-purity urea ammonium polyphosphate liquid assaying from about 18 percent to about 28 percent by weight $P_2O_5$.

7. A batch-continuous process for the production of high-purity urea-ammonium polyphosphate liquid which process consists essentially of the steps of:

(1) combining a predetermined portion of crystalline urea phosphate in a reaction vessel together with a predetermined portion of said high-purity urea-ammonium polyphosphate liquid, said predetermined portion of said crystalline urea phosphate ranging from about 25 percent to about 75 percent of the total crystalline urea phosphate utilized in the production of said urea-ammonium polyphosphate liquid and said predetermined portion of said urea-ammonium polyphosphate liquid being in sufficient quantity to impart fluidity into the resulting mixture of same with said crystalline urea phosphate;

(2) subsequently introducing into said reaction vessel a predetermined quantity of anhydrous ammonia, said predetermined quantity of anhydrous ammonia being sufficient to provide heat of reaction to raise the temperature of the resulting mixture in said reaction vessel from about ambient temperatures of the materials introduced thereinto up to the range of about 220° F. to about 300° F. to thereby yield a resulting melt of urea-ammonium phosphate, and said predetermined quantity of anhydrous ammonia limited so as to substantially eliminate loss of unreacted portions thereof from said reaction vessel;

(3) concurrently introducing the remaining 75 to 25 percent of the total crystalline urea phosphate utilized in the production of said urea ammonium polyphosphate liquid, together with relatively small quantities of anhydrous ammonia, and maintaining the resulting melt of urea ammonium phosphate in said reaction vessel within said temperature range for a period of about 5 to about 60 minutes to effect the condensation of said urea-ammonium phosphate to urea ammonium polyphosphate, said relatively small quantities of anhydrous ammonia limited so as to substantially eliminate loss of unreacted portions thereof from said reaction vessel;

(4) subsequently adding water to said reaction vessel in predetermined quantities sufficient to dissolve said urea-ammonium polyphosphate, and to effect the production of high-purity urea-ammonium polyphosphate liquids;

(5) subsequently subjecting at least a portion of said high-purity urea-ammonium polyphosphate liquid to cooling means; and (6) subsequently removing at least a portion of the resulting cooled high-purity urea-ammonium polyphosphate liquid from said reaction vessel as product.

8. The process of claim 7 wherein said predetermined portion of said high-purity urea-ammonium polyphosphate liquid fed into said reaction vessel ranges from about 10 percent to about 20 percent by weight of said resulting high-purity urea-ammonium polyphosphate liquid removed from said reaction vessel, and wherein the predetermined quantity of water added to said reaction vessel is sufficient to produce a high-purity urea ammonium polyphosphate liquid assaying from about 23 percent to about 29 percent by weight $P_2O_5$.

9. The process of claim 7 wherein a stream of ammonia is added to said reaction vessel during cooling step (5) thereof in quantity sufficient to adjust the pH of the high-purity urea-ammonium phosphate liquid therein to the range from about 5.7 to about 6.8, said pH adjustment characterized by the fact that the maximum solubility of the product liquid is effected.

10. The process of claim 9 wherein water is substituted for said predetermined portion of said high-purity urea ammonium polyphosphate liquid introduced along said crystalline urea phosphate into said reaction vessel.

11. The process of claim 9 wherein aqua ammonia is substituted for said predetermined portion of said high-purity urea ammonium polyphosphate liquid introduced along with said crystalline urea phosphate into said reaction vessel.

12. The process of claim 9 wherein the residence time for maintaining the resultant melt of urea ammonium phosphate in said reaction vessel ranges from about 5 minutes to about 45 minutes; and wherein the product liquid urea ammonium polyphosphate contains from about 10 percent to about 50 percent polyphosphate.

13. The process of claim 7 wherein subjecting the urea ammonium polyphosphate liquid to cooling means is effected in a vessel separate from said reaction vessel.

14. The process of claim 13 wherein a stream of ammonia is added to said reaction vessel during cooling step (5) thereof in quantity sufficient to adjust the pH of the high-purity urea-ammonium phosphate liquid therein to the range from about 5.7 to about 6.8, said pH adjustment characterized by the fact that the maximum solubility of the product liquid is effected.

15. The process of claim 13 wherein said predetermined portion of said high-purity urea-ammonium polyphosphate liquid fed into said reaction vessel ranges from about 10 percent to about 20 percent by weight of said resulting high-purity urea-ammonium polyphosphate liquid removed from said reaction vessel, and wherein the predetermined quantity of water added to said reaction vessel is sufficient to produce a high purity urea ammonium polyphosphate liquid assaying from about 23 percent to about 29 percent by weight $P_2O_5$.

16. The process of claim 13 wherein water is substituted for said predetermined portion of said high-purity urea ammonium polyphosphate liquid introduced along with said crystalline urea phosphate into said reaction vessel.

17. The process of claim 13 wherein aqua ammonia is substituted for said predetermined portion of said high-purity urea ammonium polyphosphate liquid introduced along with said crystalline urea phosphate into said reaction vessel.

18. The process of claim 13 wherein the residence time for maintaining the resultant melt of urea-ammonium phosphate in said reaction vessel ranges from about 5 minutes to about 45 minutes; and wherein the product liquid urea ammonium polyphosphate contains from about 10 percent to about 50 percent polyphosphate.

* * * * *

UNITED STATES PATENT AND TRADEMARK OFFICE
CERTIFICATE OF CORRECTION

PATENT NO. : 4,292,067

DATED : Sept. 29, 1981

INVENTOR(S) : John M. Stinson et al

It is certified that error appears in the above—identified patent and that said Letters Patent is hereby corrected as shown below:

Column 8, line 9, "percent" should read -- present --

Column 17, claim 4, line 45, "claims 1 or 3" should -- claims 1 or 2 --.

Signed and Sealed this

Sixteenth Day of February 1982

[SEAL]

Attest:

Attesting Officer

GERALD J. MOSSINGHOFF

Commissioner of Patents and Trademarks